United States Patent [19]

Nomura

[11] Patent Number: 5,708,728
[45] Date of Patent: Jan. 13, 1998

[54] COLOR IMAGE PROCESSING DEVICE WITH ERROR-DIFFUSION BINARIZATION FUNCTION

[75] Inventor: Mayumi Nomura, Ichihara, Japan

[73] Assignee: Brother Kogyo Kabushiki Kaisha, Aichi-ken, Japan

[21] Appl. No.: 648,579

[22] Filed: May 16, 1996

[30] Foreign Application Priority Data

May 16, 1995 [JP] Japan .................................. 7-116977

[51] Int. Cl.$^6$ ............................... H04N 1/40; H04N 1/46
[52] U.S. Cl. .......................... 382/162; 358/448; 358/456; 358/459; 358/534; 382/162
[58] Field of Search ..................... 358/429, 443, 358/447, 448, 453, 455, 456, 458, 459, 460, 465, 518, 529, 530, 534; 382/162, 166, 167, 251, 252, 254

[56] References Cited

U.S. PATENT DOCUMENTS

| | | | |
|---|---|---|---|
| 4,680,645 | 7/1987 | Dispoto et al. | 358/459 |
| 4,958,218 | 9/1990 | Katayama et al. | 358/530 |
| 5,181,104 | 1/1993 | Sugishima et al. | 358/500 |
| 5,331,429 | 7/1994 | Levien | 358/456 |
| 5,402,245 | 3/1995 | Motta et al. | 358/523 |
| 5,406,392 | 4/1995 | Aoki et al. | 358/502 |
| 5,521,989 | 5/1996 | Fan | 382/252 |
| 5,553,166 | 9/1996 | Kakutani | 382/252 |

OTHER PUBLICATIONS

IEEE Spectrum, Bell Telephone Laboratories, Inc., Mar. 1969, "Images from computers", Schroeder, pp. 67–79.

Computer Graphics and Image Processing 5, 13–40 (1976), Bell Laboratories, New Jersey, US, "A survey of Techniques for the Display of Continuous Tone Pictures on Bilevel Displays", J>F Jarvis et al., pp. 13–40.

"Graduation Processing", *Basics of Imaging Technology*, (1991).

Robert W. Floyd, et al. "An Adaptive Algorithm for Spatial Greyscale", *Proceeding of the S.I.D.* vol. 17/2 Second Quarter (1976) pp.75–76.

"Dithering Method" Electronic Image Association Report, vol. 10, No. 5 (1981), pp. 388–397.

Primary Examiner—Edward L. Coles, Sr.
Assistant Examiner—Kimberly A. Williams
Attorney, Agent, or Firm—Oliff & Berridge

[57] ABSTRACT

Input chromatic densities IC, IM, and IY are first converted into corrected chromatic densities I'C, I'M, and I'Y based on the input density IK. The input density IK is then added with the corresponding weighted error sum EK, so that a modified density IKmod is obtained. Similarly, the corrected chromatic densities I'C, I'M, and I'Y are added with the weighted error sums EC, EM, and EY, respectively, so that modified densities ICmod, IMmod, and IYmod are obtained. Then, the modified density IKmod is compared with the threshold T, and an output OK is determined. When the obtained output OK is zero, the ICmod, IMmod, and IYmod are compared with the threshold T, and output data OC, OM, and OY are obtained. On the other hand, when the obtained output OK is a dot-forming data, the output data OC, OM, and OY are forcibly set to a non-dot forming data.

18 Claims, 12 Drawing Sheets

|   |   | * | $\frac{7}{48}$ e | $\frac{5}{48}$ e |
| --- | --- | --- | --- | --- |
| $\frac{3}{48}$ e | $\frac{5}{48}$ e | $\frac{7}{48}$ e | $\frac{5}{48}$ e | $\frac{3}{48}$ e |
| $\frac{1}{48}$ e | $\frac{3}{48}$ e | $\frac{5}{48}$ e | $\frac{3}{48}$ e | $\frac{1}{48}$ e |

| | | |
|---|---|---|
| $IC_{00}$, $IM_{00}$ $IY_{00}$, $IK_{00}$ | $IC_{01}$, $IM_{01}$ $IY_{01}$, $IK_{01}$ | $IC_{02}$, $IM_{02}$ $IY_{02}$, $IK_{02}$ |
| $IC_{10}$, $IM_{10}$ $IY_{10}$, $IK_{10}$ | $IC_{11}$, $IM_{11}$ $IY_{11}$, $IK_{11}$ | $IC_{12}$, $IM_{12}$ $IY_{12}$, $IK_{12}$ |
| $IC_{20}$, $IM_{20}$ $IY_{20}$, $IK_{20}$ | $IC_{21}$, $IM_{21}$ $IY_{21}$, $IK_{21}$ | $IC_{22}$, $IM_{22}$ $IY_{22}$, $IK_{22}$ |

COLOR IMAGE PROCESSING DEVICE WITH ERROR-DIFFUSION BINARIZATION FUNCTION

BACKGROUND OF THE INVENTION

1. Field of the Invention

The present invention relates to a color image processing device for binarizing a color continuous tone image to produce a color pseudo-continuous tone image.

2. Description of the Related Art

A color image processing device, capable of binarizing a color continuous tone image (original image), can be applied to a bilevel image forming device that forms an image from presence or absence of dots. The color image processing device is inputted with original image data. The original image data represents densities or tones of all the pixels of the original image for each of a plurality of color components. The color image processing device produces output data through binarizing the inputted densities of each color component into two values. Thus produced output data represents a pseudo-continuous tone image constructed from two tone levels for each color component. Receiving the output data, the bilevel image forming device forms binary images for all the color components so that the produced binary images will be composed into a single color image. Typical examples of the bilevel image forming device include digital photoelectric copy machines, thermal-transfer printers, ink jet printers, and the like.

Dithering is one conventional method for binarizing a continuous tone image to produce pseudo-continuous tone image data. In an ordered-dither technique, images are binarized according to a threshold matrix (dither matrix) table. A large matrix table is required to accurately reproduce original tones. On the other hand, a small matrix table is required to obtain high resolution of images. Because of these conflicting requirements, it has been difficult to obtain both good tone reproducibility and high resolution.

Error diffusion (ED) is one conventional method that obtains both good tone reproducibility and high resolution with relative success. In the error diffusion method, inputted densities of all the picture elements (pixels) are binarized pixel by pixel in the following manner. That is, an input density of a first pixel is compared with a predetermined threshold value. If the input density is higher than or equal to the threshold, an output data having a value indicating production of a dot is produced. If the input density is lower than the threshold, an output data having another value indicating production of no dots is produced. A binarization error is therefore generated as a difference between the inputted density and the thus obtained output value. This binarization error is "diffused" or distributed to neighboring pixels to modify the inputted densities of the neighboring pixels. A subsequent pixel, that has had its value thus modified, is then compared with the threshold value, and then judged to be a dot or none dot based on the compared result. All pixels are thus serially compared to the threshold value while being modified by the binarization errors derived from the processings of preceding pixels.

The conventional diffusion method will be described below in greater detail with reference to FIGS. 1 through 4. In the following description, it will be assumed that each pixel is inputted at a density with an integral value within the range of 0 through 255 and is binarized into an output value of either 0 or 255.

FIG. 1 is a flow chart representing procedures of the conventional binarization processes. Data of inputted density I of a first object pixel is retrieved from an original image memory in step S1. A predetermined threshold value T is then retrieved from another memory in S2. Generally, the threshold value T is an intermediate value within the range of inputted densities. In this example, because inputted densities are in the range of 0 to 255, the threshold value T is set to 128. Next, in S3, a weighted error sum E is retrieved from a weighted error buffer for the object pixel. The input density I is then modified into a modified input density I' by adding the weighted error sum E to the input density I. It is noted that the weighted error sum E is a value obtained by accumulating weighted binarization errors, which are distributed to the object pixel during processings of preceding pixels. In more concrete terms, the weighted error sum E is a result of accumulation of weighted binarization errors, which have been produced in step S8 (to be described later) during binarization processes for nearby pixels conducted prior to the present binarization process.

Then, the program proceeds to S4. In S4, a binary output O for the object pixel is determined through comparing the modified input density I' with the threshold value T in the following manner. It is judged in S4 whether I' is greater than or equal to the value T. When I' is greater than or equal to the threshold T, the output value O is set in S5 to the value of "255" to produce a dot. When I' is less than the threshold T, the output value O is set in S6 to the other value of "0" to produce a non-dot. Thus obtained output data O is stored in S7 in an output data memory.

Next, in S8, a binarization error "e" is determined by subtracting the output value O from the modified input value I' as expressed by the following equation (1):

$$e = I' - O \tag{1}$$

In order to distribute the binarization error "e" of the object pixel to the subsequent neighboring pixels, first a weight coefficient matrix α is retrieved in S9 from another memory. The weight coefficient matrix α is represented by the following equation (2):

$$\alpha = \begin{pmatrix} * & 7 & 5 \\ 3 & 5 & 7 & 5 & 3 \\ 1 & 3 & 5 & 3 & 1 \end{pmatrix} \tag{2}$$

The binarization error "e" generated in the object pixel is then distributed in S10 to the neighboring pixels using the retrieved weight coefficient matrix α. In this step, weight coefficients for neighboring pixels, that are positioned in relation to the object pixel (represented by the asterisk *) as shown in FIG. 9, are obtained by calculating ratios of the elements of the weight coefficient matrix α (i.e., numerators) at corresponding positions with respect to the total value of all the elements (i.e., denominator). The coefficients are then multiplied by the binarization error "e" of the object pixel. Thus obtained products are added to weighted error buffers for the pixels at the corresponding positions.

This completes processes on the object pixel. Then, S11 is attained, and the above-described processes are performed to the next pixel. Thus, the above-described processes are repeated to all the pixels constituting the original image, and output data O is obtained for all the pixels. The output data will represent a pseudo-continuous tone image.

The above-described error-diffusion binarization processes are independently conducted for all the color components: black, cyan, magenta, and yellow of the original image. In more concrete terms, the color image processing device is inputted with data of input densities IK, IC, IM, and IY for black, cyan, magenta, and yellow color components of the color continuous tone image. The input densities of the respective color components are then independently subjected to the above-described error-diffusion binarization processes. Output data OK, OC, OM, and OY are obtained to represent corresponding color componental pseudo-continuous tone image. The printer will be controlled by those output data to print corresponding color images, to thereby form a color image.

In order to save ink, however, black color dots only are printed on pixels where output data of OC, OM, and OY all have dot-forming values of 255. At pixels where black output data OK have the dot-forming values of 255, output data OC, OM, and OY are forcibly converted into zero.

SUMMARY OF THE INVENTION

The present inventor has examined the above-described conventional color image processing operations, and has found that these operations suffer from the following problem.

The error-diffusion binarization processes determine output data while uniformly distributing binarization errors to surrounding pixels. The output data can therefore represent the input image with high reproducibility. In more concrete terms, because output data OK, OC, OM, and OY are produced independently through error-diffusion processes, they can represent the black, cyan, magenta, and yellow color componental images, respectively, of the original image with high reproducibility. However, as mentioned above, chromatic output data OC, OM, and OY is forcibly converted to non-dot forming data with respect to pixels corresponding dot-forming black data OK. The binarization error obtained from such output data OC, OM, and OY is lost and so not uniformly distributed.

This problem particularly becomes outstanding when chromatic pixels (i.e., cyan, magenta, and/or yellow pixels) of the original image are closely mixed with black pixels. In this case, although uniformly distributed in the original image, the chromatic pixels will be arranged nonuniformly in the output image. That is, chromatic pixels will be clustered at certain areas and thin at other areas.

Figure 2:
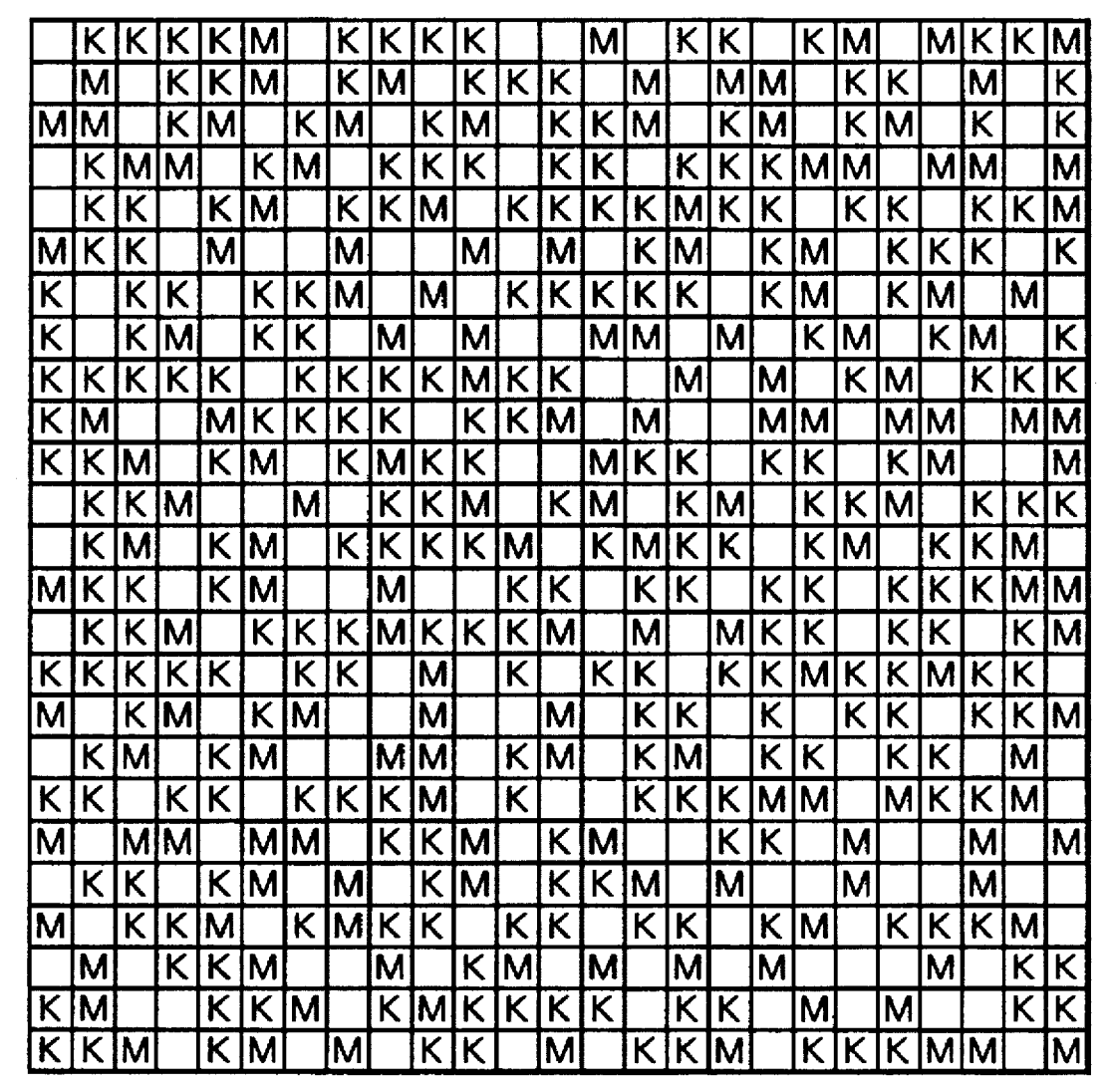
Figure 3:
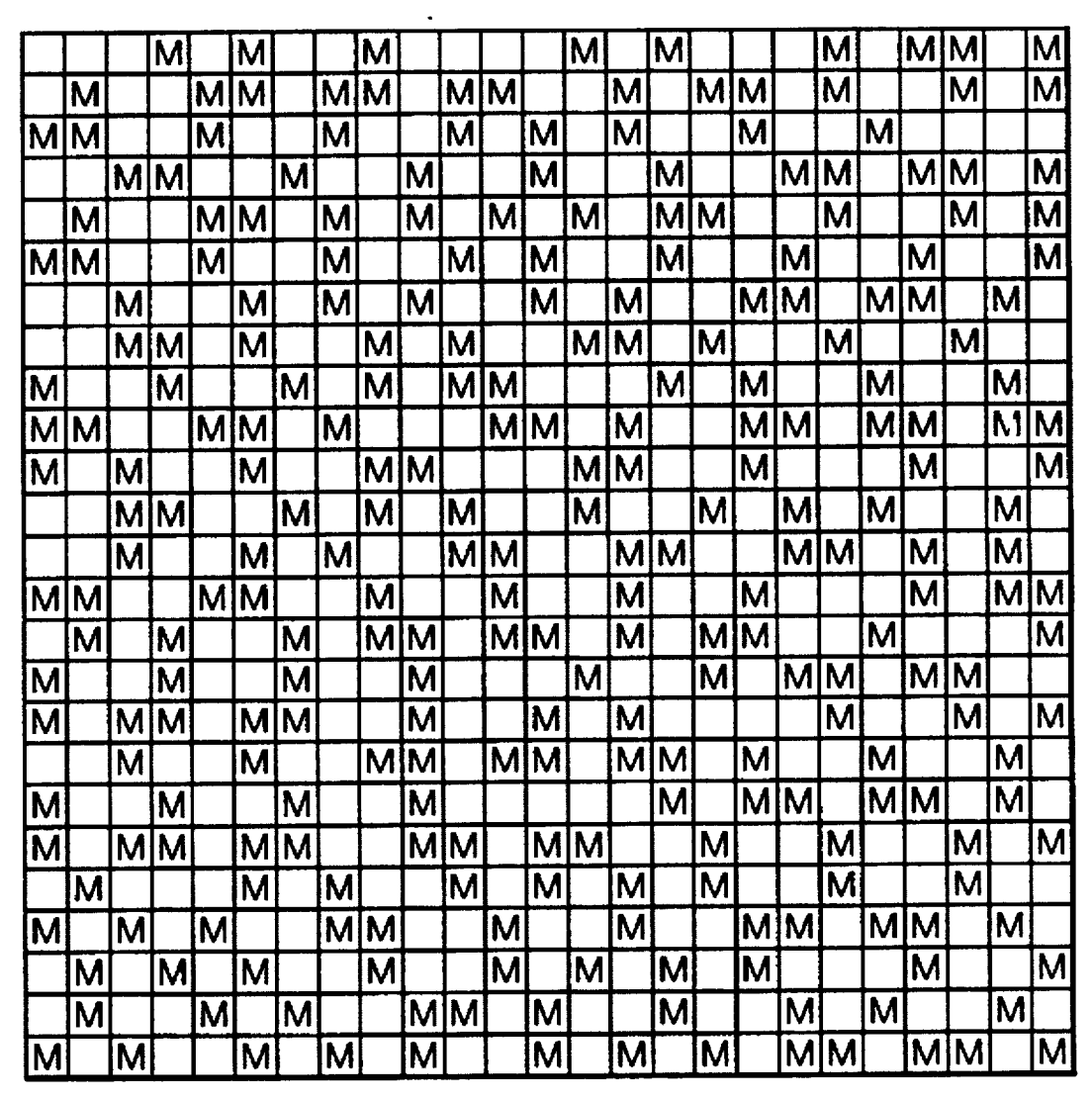

FIGS. 2 through 4 show how an output image is obtained when an original image is subjected to the above-described conventional image processing operations.

It is assumed that in this original image, both magenta and black colors are uniformly distributed and in close proximity to each other. For example, inputted densities K have a fixed value for all the pixels. Similarly, inputted densities IM have another fixed value for all the pixels. Inputted densities IC and IY are zero for all the pixels. In the image processing operations, first, these input densities IK, IC, IM, and IY are independently subjected to the binarization process of FIG. 1 to produce binarized output data OK, OC, OM, and OY, of which all the output data OC and OY has the value of zero.

FIG. 3 shows the results of the binarization processes of FIG. 1 for magenta color only. FIG. 3 shows that because binarization errors are uniformly distributed in the error-diffusion binarization processes, pixels M, where the output data OM has the dot-forming value of 255, are distributed uniformly.

Then, the output data OM is forcibly converted into zero at pixels where black output data OK has the dot-forming value of 255. As apparent from FIG. 4, the magenta dot-forming pixels M are not uniformly distributed after this forcible conversion to magenta color. Dot-forming pixels M are clustered together in some areas, but scattered thinly in others. Thus, the image of FIG. 4 fails to accurately represent the magenta color componental image of the original image.

FIG. 2 shows a finally obtained color image wherein magenta ink is applied to the magenta dot-forming pixels M in FIG. 4 and black ink is provided to black dot-forming pixels K. As apparent from FIG. 2, lumps of magenta colors are produced here and there over the entire image. Because magenta colors are distributed nonuniformly in this manner, the produced color image can not accurately reproduce the original image.

It is therefore an objective of the present invention to overcome the above-described problems and to provide an improved color image processing device which is capable of producing a pseudo-continuous tone color image which can properly reproduce even a continuous tone color image where chromatic colors are uniformly and closely mixed with black color.

In order to attain the objective and other objectives, the present invention provides a color image processing device for binarizing a color continuous tone image to produce color pseudo-continuous tone image data, the device comprising: modification means for modifying input density data of each pixel for each of a plurality of color components with a corresponding sum of binarization errors which are distributed to the subject pixel from at least one preceding nearby pixel. The plurality of color components including a predetermined color component and at least one reference color component: predetermined color output determination means for comparing the modified input density of the subject pixel for the predetermined color component with a predetermined threshold value, thereby determining binarized output data for the predetermined color component, the binarized output data being either one of a dot-forming data and a non-dot forming data, the dot-forming data indicating production of a dot of the predetermined color component on the subject pixel, the non-dot forming data indicating production of no dots of the predetermined color component on the subject pixel; reference color output determination means for comparing, when the binarized output data for the predetermined color component is a non-dot forming data, the modified input density of the subject pixel for the reference color component with the predetermined threshold value, thereby determining binarized output data for the reference color component, the binarized output data being either one of a dot-forming data and a non-dot forming data, the dot-forming data indicating production of a dot of the reference color component on the subject pixel, the non-dot forming data indicating production of no dots of the reference color component on the subject pixel, the reference color output determination means determining binarized output data for the reference color component as the non-dot forming data when the binarized output data for the predetermined color component is a dot-forming data; binarization error determining means for determining a binarization error for the predetermined color component as a difference between the modified input density data of the predetermined color component and the binarized output data for the predetermined color component and for determining a binarization error for the reference color component as a difference between the modified input density data of the reference color component and the binarized output data for the reference color component; and means for distributing the binarization errors of the predetermined color component and of the reference color component to at least one subsequent nearby pixel which has not yet been binarized.

The device may further comprise reference color conversion means for converting the input density data of the reference color component into a converted input density data based on the input density data of the predetermined color component, the modification means modifying the converted input density data of the subject pixel for the reference color component with the corresponding sum of binarization errors distributed to the subject pixel from the at least one preceding nearby pixel.

In the device, the reference color conversion means may calculate, as the converted input density data, a product of the input density data of the reference color component and a ratio of a difference between a maximum inputtable density data and the input density data of the predetermined color component relative to the maximum inputtable density data.

According to another aspect, the present invention provides a method of binarizing a color continuous tone image to produce color pseudo-continuous tone image data, the method comprising the steps of: modifying input density data of one pixel for each of a plurality of color components with a corresponding sum of binarization errors which are distributed to the subject pixel during error-diffusion binarization processes previously performed for at least one preceding nearby pixel, the plurality of color components including a predetermined color component and at least one reference color component; comparing the modified input density of the subject pixel for the predetermined color component with a predetermined threshold value, thereby determining binarized output data for the predetermined color component, the binarized output data being either one of a dot-forming data and a non-dot forming data, the dot-forming data indicating production of a dot of the predetermined color component on the subject pixel, the non-dot forming data indicating production of no dots of the predetermined color component on the subject pixel; comparing, when the binarized output data for the predetermined color component is a non-dot forming data, the modified input density of the subject pixel for the reference color component with the predetermined threshold value, thereby determining binarized output data for the reference color component, the binarized output data being either one of a dot-forming data and non-dot forming data, the dot-forming data indicating production of a dot of the reference color component on the subject pixel, the non-dot forming data indicating production of no dots of the reference color component on the subject pixel; determining binarized output data for the reference color component as the non-dot forming data when the binarized output data for the predetermined color component is a dot-forming data; determining a binarization error for the predetermined color component as a difference between the modified input density data of the predetermined color component and the binarized output data for the predetermined color component and determining a binarization error for the reference color component as a difference between the modified input density data of the reference color component and the binarized output data for the reference color component; and distributing the binarization errors of the predetermined color component and of the reference color component to at least one subsequent nearby pixel which has not yet been binarized.

The method may further comprise the step of converting the input density data of the reference color component into a converted input density data based on the input density data of the predetermined color component, the converted input density data of the subject pixel for the reference color component being modified with the corresponding sum of binarization errors distributed to the subject pixel from the at least one preceding nearby pixel.

BRIEF DESCRIPTION OF THE DRAWINGS

The above and other objects, features and advantages of the invention will become more apparent from reading the following description of the preferred embodiment taken in connection with the accompanying drawings in which:

FIGS. 2 through 4 illustrate how the conventional color image processing operation produces an output image from an input image where magenta and black colors are uniformly distributed, where FIG. 2 shows a finally-obtained output color image where black and magenta colors are distributed, FIG. 3 shows magenta dot-forming pixels determined through the error-diffusion binarization process of FIG. 1, and FIG. 4 shows magenta dot-forming pixels obtained after magenta output data are forcibly converted into zero at pixels where black output data have the value of 255;

FIG. 9 illustrates the relationship between an object pixel and neighboring pixels, to which a binarization error produced at the object pixel are distributed;

FIGS. 10 and 11 illustrate how the color image processing device of the present embodiment produces an output image from an input image where magenta and black colors are uniformly and intimately distributed, where FIG. 10 shows an output color image where black and magenta colors are distributed, and FIG. 11 shows magenta dot-forming pixels obtained through the error-diffusion binarization process of the present embodiment shown in FIG. 6; and FIG. 12 is a diagram showing a concrete example of the order in which input densities of the original image are subjected to the binarization processes of the present invention where nine pixels constitute the original image.

DETAILED DESCRIPTION OF THE PREFERRED EMBODIMENT

Figure 1:
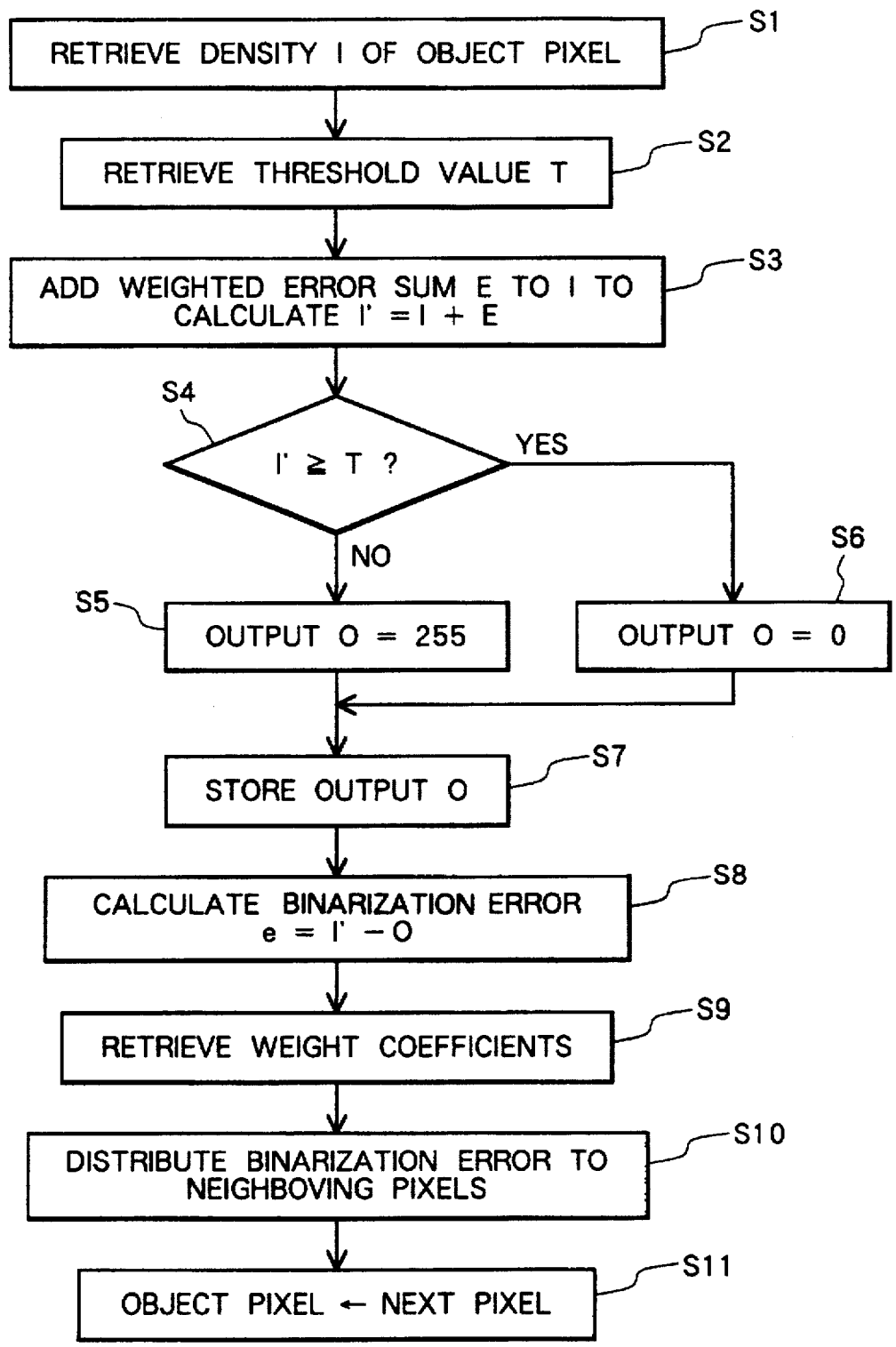
FIG. 1 is a flow chart of a conventional error-diffusion binarization process employed in a conventional color image processing device.
Figure 4:
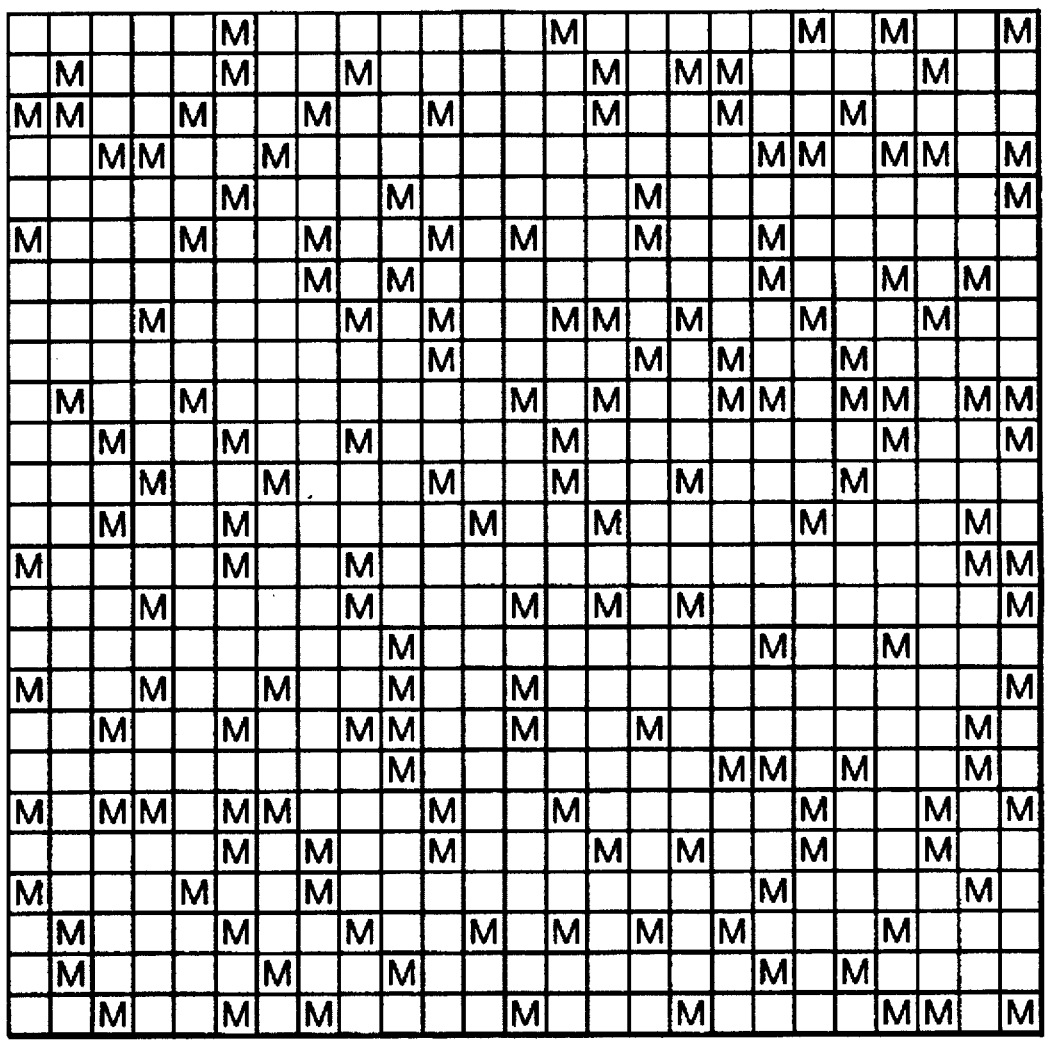

An image processing device according to a preferred embodiment of the present invention will be described while referring to the accompanying drawings wherein like parts and components are designated by the same reference numerals to avoid duplicating description.

Figure 5:
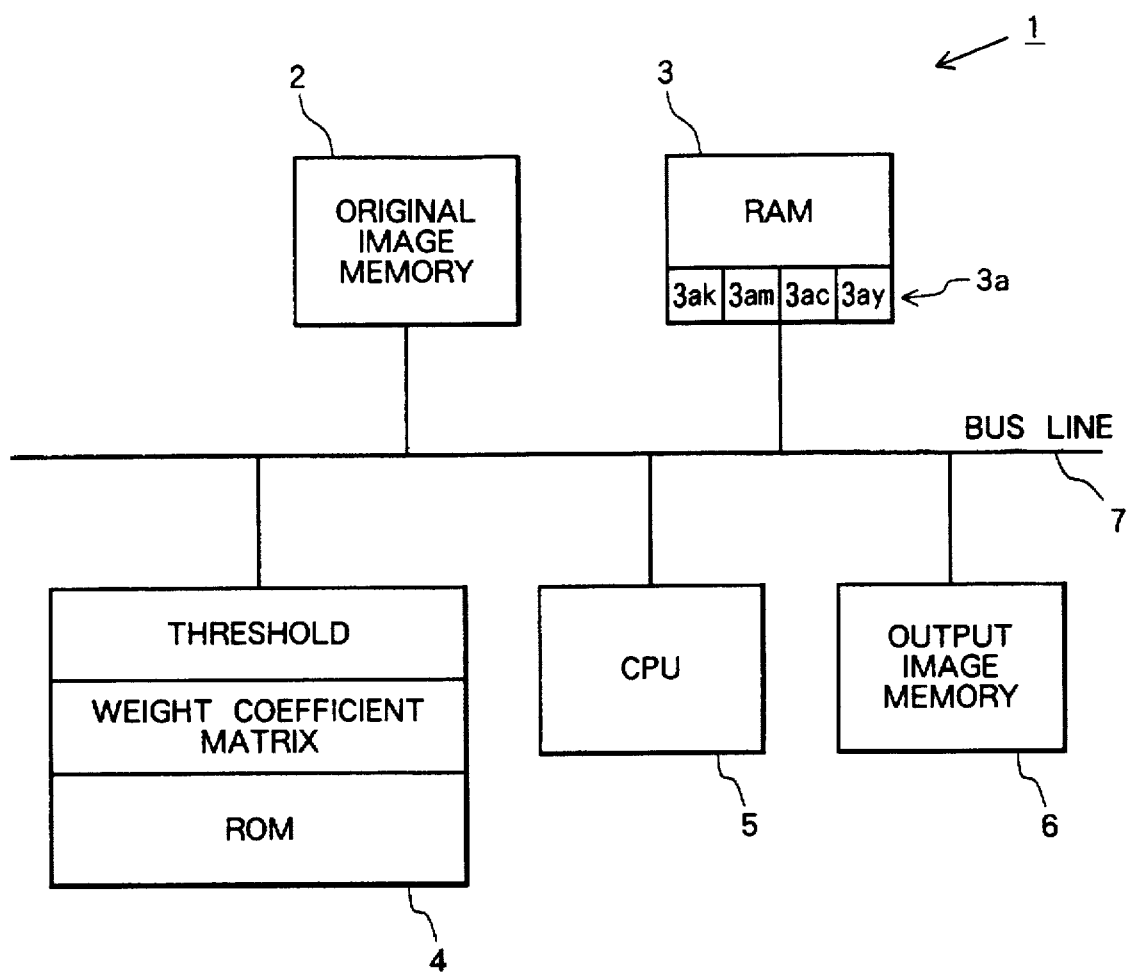
FIG. 5 is a block diagram of a color image processing device according to an embodiment of the present invention.

FIG. 5 is a block diagram showing a color image processing device or circuit 1 according to the present embodiment. The color image processing device 1 is for binarizing a color continuous tone image (original image) to produce color pseudo-continuous tone image data. The color image processing device 1 is mounted in a bilevel device, such as a digital color printer, that forms images from presence or absence of dots. In This example, the digital color printer produces color pseudo-continuous tone images by printing dots in four color inks: black (K), cyan (C), magenta (M), and yellow (Y) color inks.

The color image processing device 1 performs error-diffusion binarization processes characteristic to the present invention. The color image processing device 1 is constructed from a computer, for example, and performs desired calculation processes on inputted data.

The image processing circuit 1 includes: an original image memory 2; a RAM 3; a ROM 4; a CPU 5; and an output image memory unit (image memory) 6; which are connected via a bus line 7. Original image information is inputted to the bus line 7 through an image input port (not shown in the drawing) in the form of a digital electric signal (original image data). The original image data can be inputted via the bus line 7 in single pixel, line, or screen units. The thus inputted image data I for each pixel includes a set of four density values IC, IM, IY, and IK for cyan, magenta, yellow, and black color components, respectively. These densities IC, IM, IY, and IK will be referred to as input densities hereinafter.

The original image memory 2 is for temporarily storing at least a portion of the original image data successively transmitted from the bus line 7. The ROM 4 stores image processing programs including the error-diffusion binarization programs shown in FIGS. 6 through 8, a predetermined weight coefficient matrix α used for distributing or diffusing a binarization error developed during a binarization process, a predetermined threshold value T, and the like. The weight coefficient matrix α is determined by the previously-described equation (2).

The RAM 3 is for temporarily storing results of each calculation process. The RAM 3 has a plurality of weighted error buffers 3a each assigned to a corresponding pixel of the original image. Each error buffer 3a includes four sets of buffers 3ak, 3ac, 3am, and 3ay for the respective colors of black, cyan, magenta, and yellow. The weighted error buffer 3ak is for producing a weighted error sum EK of a black color component. That is, the error buffer 3ak is accumulated with weighted binarization errors, which are generated when black color components IK of nearby pixels are binarized. Similarly, the weighted error buffers 3ac, 3am, and 3ay are for respectively producing weighted error sums EC, EM, and EY of cyan, magenta, and yellow components. That is, the weighted error buffers 3ac, 3am, and 3ay are accumulated with weighted binarization errors, which are generated when cyan, magenta, and yellow color components IC, IM, and IY of nearby pixels are binarized.

The CPU 5 is for performing various image processes with using the programs and data stored in the ROM 4 and with using the calculated results stored in the RAM 3. According to the present invention, the CPU 5 performs an error-diffusion binarization process on the input densities IC, IM, IY, and IK stored in the original image memory 2, to obtain output data OC, OM, OY, and OK representative of a binary image for the original image. The output image memory 6 is for temporarily storing the output data.

The bus line 7 is connected to a printing portion of the printer (not shown in the drawing). The output data is fed from the output image data memory 6 via the bus line 7 to the printing portion, where binary images are produced from presence or absence of dots according to the output data OC, OM, OY, and OK. That is, the printing portion prints cyan, magenta, yellow, and black color components based on output data OC, OM, OY, and OK, to thereby produce a color binary image.

Next, while referring to FIGS. 6 through 8, the binarization procedures of the present invention will be explained. In the binarization processes, the input densities IC, IM, IY, and IK are binarized into output data OC, OM, OY, and OK. In the following example, the input density values IC, IM, IY, and IK are designated as one of 256 levels from 0 to 255. The threshold value T stored in the ROM 4 is 128 in this example.

Figure 6:
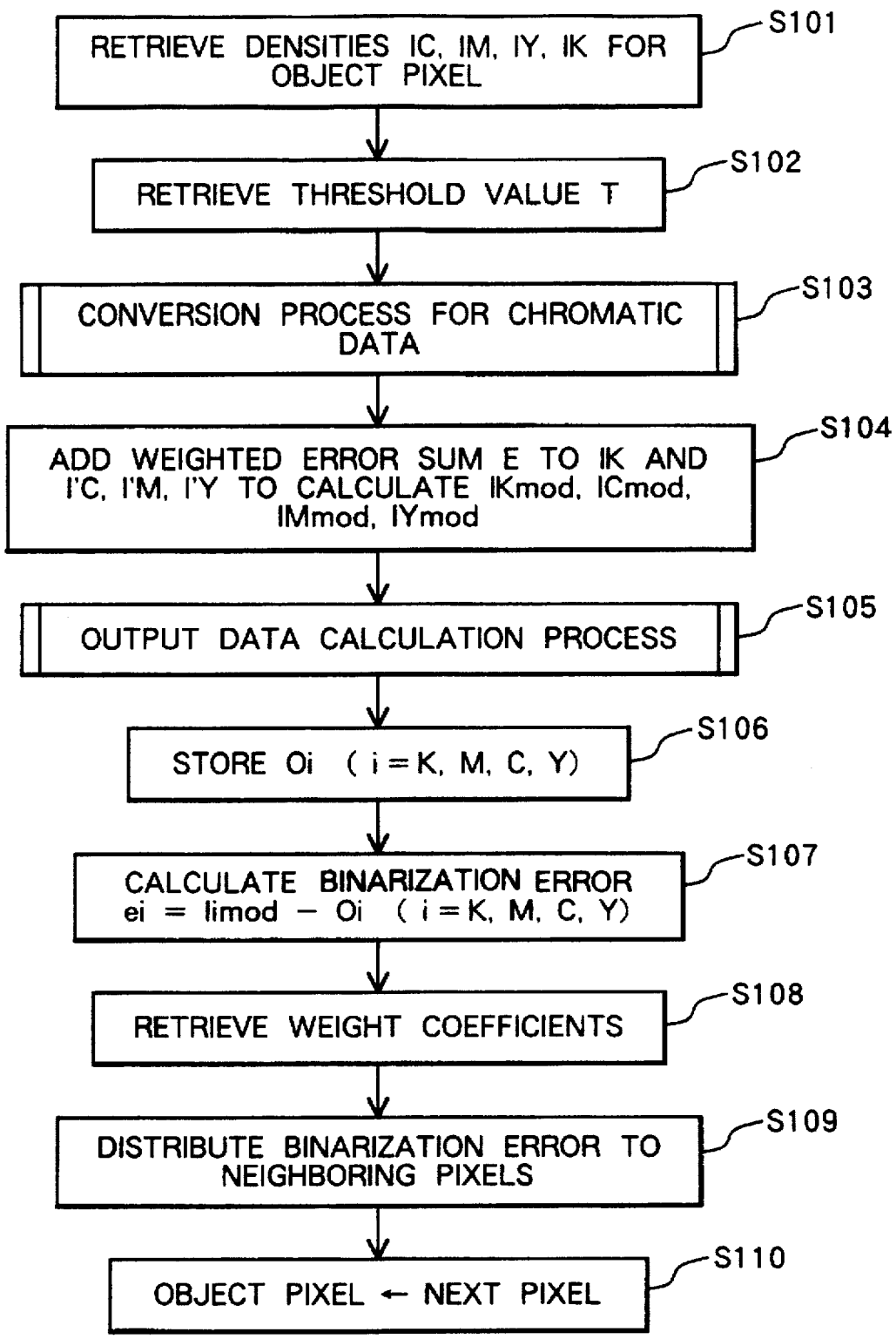
FIG. 6 is a flow chart of the binarization process performed in the color image processing device of FIG. 5.

FIG. 6 is a flow chart representing procedures of the binarization processes of the present embodiment. Input densities IC, IM, IY, and IK of a first object pixel are retrieved from the original image memory 2 in step S101. Next, the predetermined threshold value T is retrieved from the ROM 4 in S102.

Then, in S103, the input chromatic densities IC, IM, and IY are converted into corrected chromatic densities I'C, I'M, and I'Y in the following manner.

Figure 7:
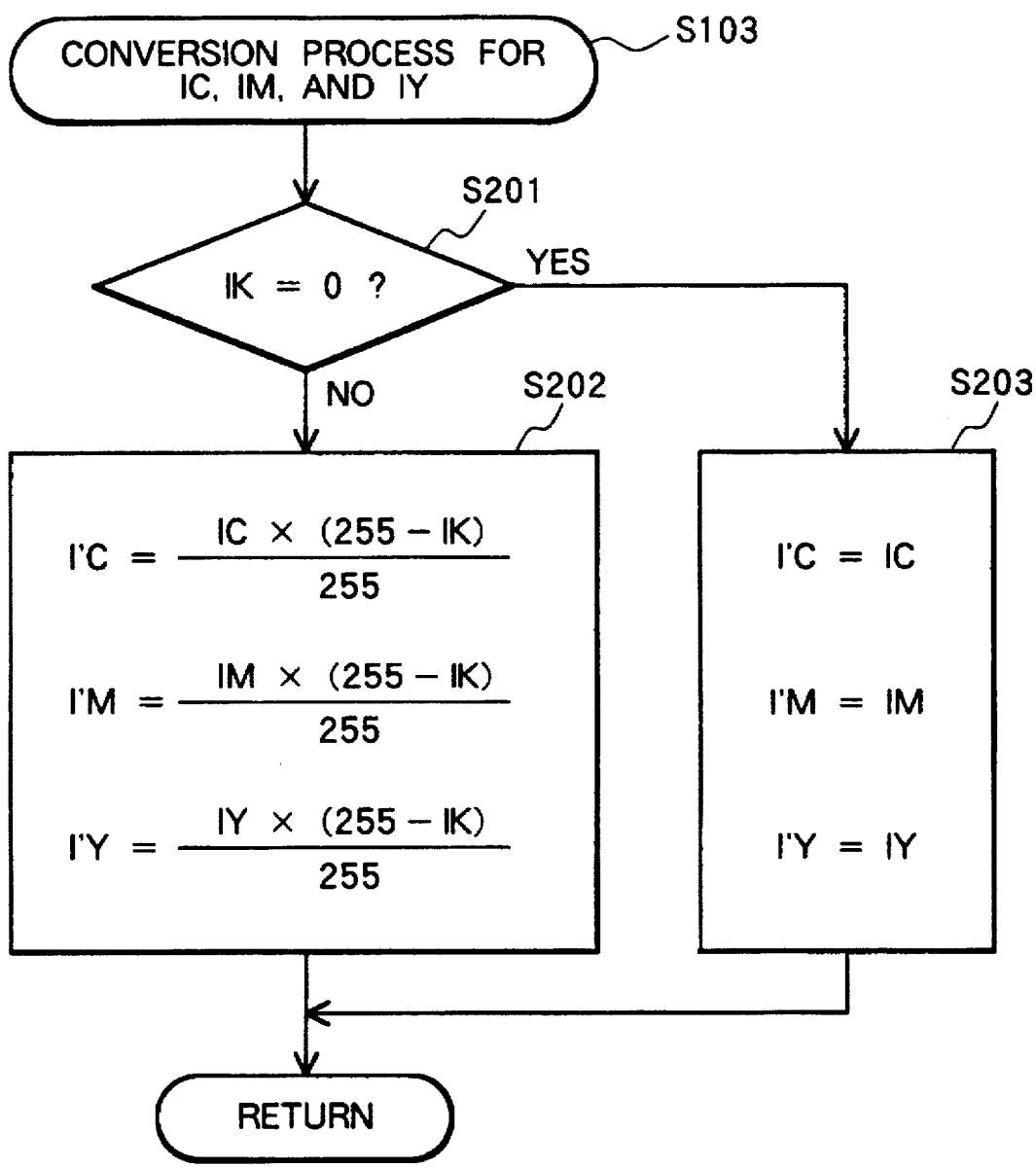
FIG. 7 is a flow chart of an input density conversion process provided in the binarization process of FIG. 6.

As shown in FIG. 7, in this conversion process S103, it is first judged in S201 whether the value of the input black density K is equal to zero (0). If not ("No" in S201), the values IC, IM, and IY are converted in S202 into corrected values I'C, I'M, and I'Y according to the following set of equations (3).

$$I'C = IC \times (255 - IK)/255$$

$$I'M = IM \times (255 - IK)/255$$

$$I'Y = IY \times (255 - IK)/255 \tag{3}$$

On the other hand, when the density IK is equal to zero ("Yes" in S201), the values I'C, I'M, and I'Y are set in S203 as equal to the original values IC, IM, and IY, respectively.

Thus, each of the corrected chromatic densities I'C, I'M, and I'Y is calculated as a product of the corresponding input density (IC, IM, or IY) and a ratio of a difference between a maximum inputtable density 255 and the black input density IK relative to the maximum inputtable density 255. As will be described later, output data OC, OM, and OY produced from the corrected values I'C, I'M, and I'Y will accurately reproduce chromatic components, i.e., saturation, of the original image. Additionally, it is possible to prevent overflow of binarization errors.

Then, the program returns to S104 of the main routine in FIG. 6, in S104, the inputted value IK and the corrected values I'C, I'M, and I'Y are modified into values IKmod, ICmod, IMmod, and IYmod in the following manner.

That is, weighted error sums EX, EC, EM, and EY are retrieved from the weighted error buffers 3ak, 3ac, 3am, and 3ay for the object pixel. Modified input densities IKmod, ICmod, IMmod, and IYmod are calculated by adding the weighted error sums EK, EC, EM, and EY to the values IK, I'C, I'M, and I'Y, respectively. The weighted error sums EK, EC, EM, and EY are obtained by adding weighted errors distributed to the object pixel during processing of pixels preceding the object pixel. In more concrete terms, the weighted error sums EK, EC, EM, and EY result from accumulation of weighted binarization errors produced for nearby pixels prior to the present binarization process.

Calculation of the modified input densities IKmod, ICmod, IMmod, and IYmod are therefore represented by the following equations (4):

$$IKmod = IK + EK$$

$$ICmod = I'C + EC$$

$$IMod = I'M + EM$$

$$IYmod = I'Y + EY \tag{4}$$

Then, the program proceeds to S105. In S105, a set of binary outputs OK, OC, OM, and OY are determined for the object pixel in the following manner through comparing the threshold value T with the modified input densities IKmod, ICmod, IMmod, and IYmod (which will be referred to generically as Iimod (i=K, C, M, or Y.))

In this step S105, the values Iimod (i=K, C, M, and Y) are subjected to the comparing process one by one so that the value IKmod is first subjected to the comparing process. As shown in FIG. 8, it is first judged in S301 whether the value Iimod to be subjected to the comparing process is IKmod. If Iimod is IKmod ("Yes" in S301,) the value IKmod is compared with the threshold value T in S302. When the IKmod is greater than or equal to the threshold T ("Yes" in S302), the output value OK is set in S303 to the value of "255" to produce a dot. When the modified input density IKmod is less than the threshold T ("No" in S302), the output value OK is set in S304 to the other value of "0" to produce a non-dot.

Because all the output data OK, OC, OM, and OY are not yet produced ("No" in S307), remaining values ICmod, IMmod, and IYmod are binarized one by one while referring to the presently obtained value OK. At this time, the program proceeds from S301 to S305. In S305, it is judged whether or not the value OK obtained for the object pixel is zero. When the value OK is zero ("Yes" in S305), the value Iimod (i=C, M, or Y) is compared with the threshold T in S302. If the value Iimod (i=C, M, or Y) is greater than or equal to the threshold T, the output value Oi (i=C, M, or Y) is set in S303 to a dot-forming value of "255." When the value Iimod is less than the threshold T, the output value Oi is set in S304 to a non-dot forming value of "0."

On the other hand, when the obtained value OK is not zero ("No" in S305) and therefore a black dot will be produced on the object pixel, Oi (i=C, M, or Y) is forcibly set to zero in S306. Thus, all the chromatic output data OC, OM, and OY for the object pixel are set to non-dot forming data regardless of whether the modified densities Iimod (i=C, M, or Y) are greater than the threshold T. The above-described processes are repeatedly performed until all the output data OK, OC, OM, and OY are obtained.

Then, the program returns to S106 of the main routine, where the determined output values OK, OC, OM, and OY are stored in the output image memory 6.

Next, in S107, binarization errors ek, ec, em, and ey generated at the object pixel are determined by subtracting the output values OK, OC, OM, and OY from the modified input values IKmod, ICmod, IMmod, and IYmod as expressed by the following equations (5):

$$ek = IKmod - OK$$
$$ec = ICmod - OC$$
$$em = IMmod - OM$$
$$ey = IYmod - OY \quad (5)$$

Next, the binarization errors ek, ec, em, and ey are distributed to subsequent neighboring pixels in the following manner.

First, the weight coefficient matrix α represented by the equation (2) is retrieved from the ROM 4 in S108. The binarization errors ek, ec, em, and ey are then distributed to the neighboring pixels with using the weight coefficient matrix α in S109. In this step, the binarization errors are distributed to twelve neighboring pixels which are positioned in relation to the object pixel (represented by the asterisk *) as shown in FIG. 9. Before being distributed to each of the neighboring pixels, the binarization errors are weighted with a corresponding weight coefficient. The weight coefficient is determined by calculating a ration of an element of the matrix α located at a corresponding position with respect to the total value of all the elements. Then, the resultant weight coefficient is multiplied by the binarization error ek, and the obtained product is added to the buffer 3ak for the corresponding neighboring pixel. Similarly, the products of the weight coefficient and the binarization errors ec, em, and ey are calculated and added to the buffers 3ac, 3am, and 3ay, respectively, for the corresponding neighboring pixel.

For example, a weight coefficient of "7/48" is obtained for the pixel to the adjacent right of object pixel * by dividing the element "7" Lo the adjacent right of the object pixel * by the total value "48" of all the elements in the matrix α (2). Then, the resultant weight coefficient 7/48 is multiplied by the binarization error ek. The product ek×(7/48) is added to the buffer 3ak for the right adjacent pixel. Similarly, the products ec×(7/48), em×(7/48), and ey×(7/48) are added to the buffers 3ac, 3am, and 3ay, respectively, for the right adjacent pixel.

This completes processes on the object pixel. Then, S110 is attained, and the above-described processes S101–S109 are performed to the next pixel. Thus, binarization processes are repeatedly performed on all the pixels pixel by pixel. As a result, sets of output data OK, OC, OM, and OY are produced for all the pixels. These output data are temporarily stored in the output image memory 6 before being fed to the printing portion. The printing portion will print a pseudo-continuous tone color image based on the output data OK, OC, OM, and OY.

It is noted that the output data OK, OC, OM, and OY may be transferred to the printing section as soon as produced. In this case, however, output data OK of each pixel has to be maintained in the memory 6 at least until the judgement for the corresponding chromatic components of S305 in FIG. 8 is completed.

As described above, according to the binarization process of the present embodiment, input chromatic densities IC, IM, and IY are first converted into corrected chromatic densities I'C, I'M, and I'Y based on the input density IK. The input density IK is then added with the corresponding weighted error sum EK, so that a modified density IKmod is obtained. Similarly, the corrected chromatic densities I'C, I'M, and I'Y are added with the weighted error sums EC, EM, and EY, respectively, so that modified densities ICmod, IMmod, and IYmod are obtained.

Then, the modified density IKmod is compared with the threshold T, and an output OK is determined. When the obtained output OK is zero (non-dot forming data), the ICmod, IMmod, and IYmod are compared with the threshold T, and output data OC, OM, and OY are obtained. On the other hand, when the obtained output OK is a dot-forming data, the output data OC, OM, and OY are forcibly set to a non-dot forming data. Afterwardly, binarization errors are calculated as differences between the produced output data and the modified input densities. The binarization errors therefore properly include errors obtained through the forcible settings of the output data OC, OM, and OY. These binarization errors are then uniformly distributed to subsequent neighboring pixels. Accordingly, the obtained output data will properly reproduce the original image even when the output data is obtained through the forcible setting operation.

Figure 8:
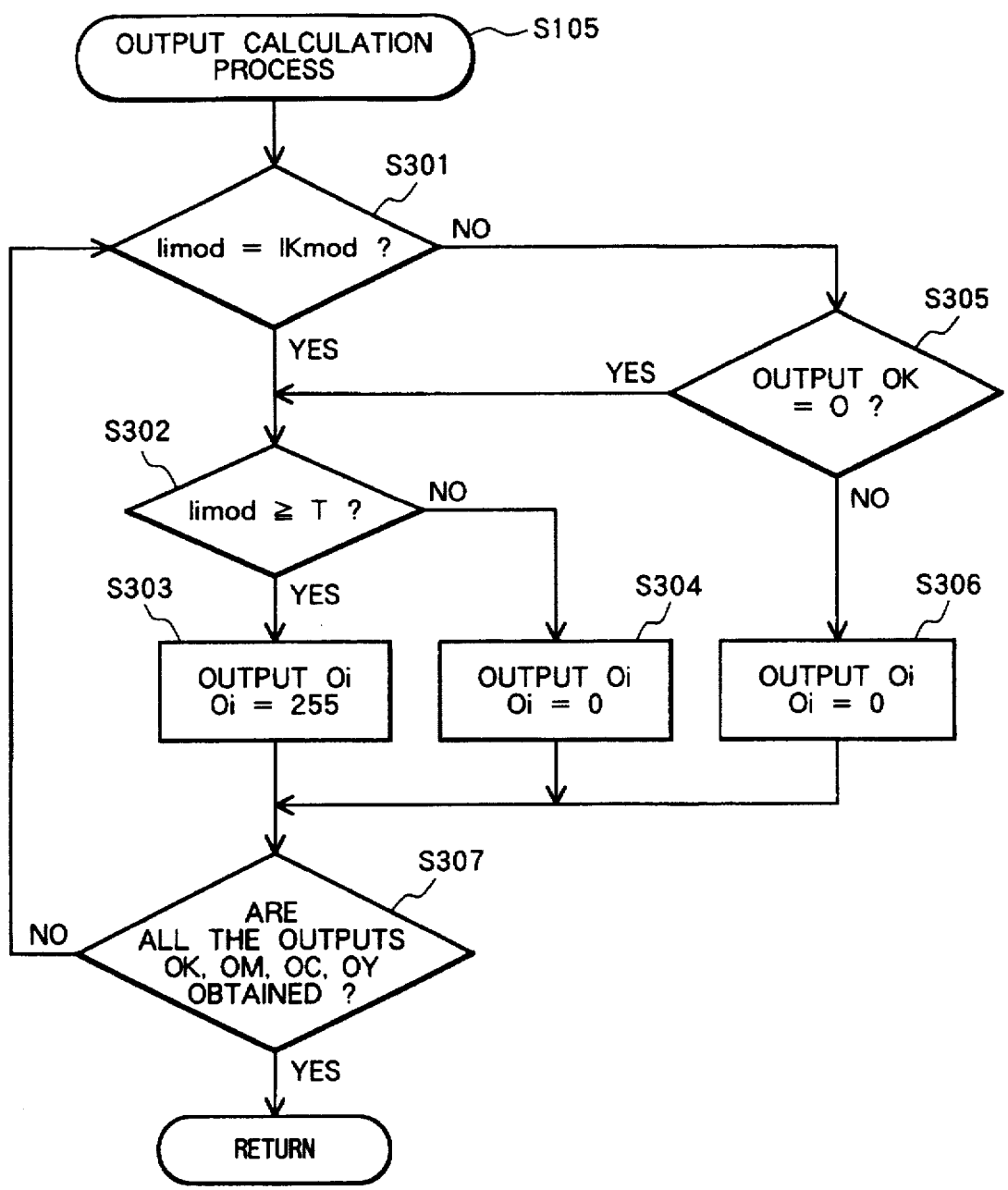
FIG. 8 is a flow chart of an output determination process provided in the binarization process of FIG. 6.
Figure 10:
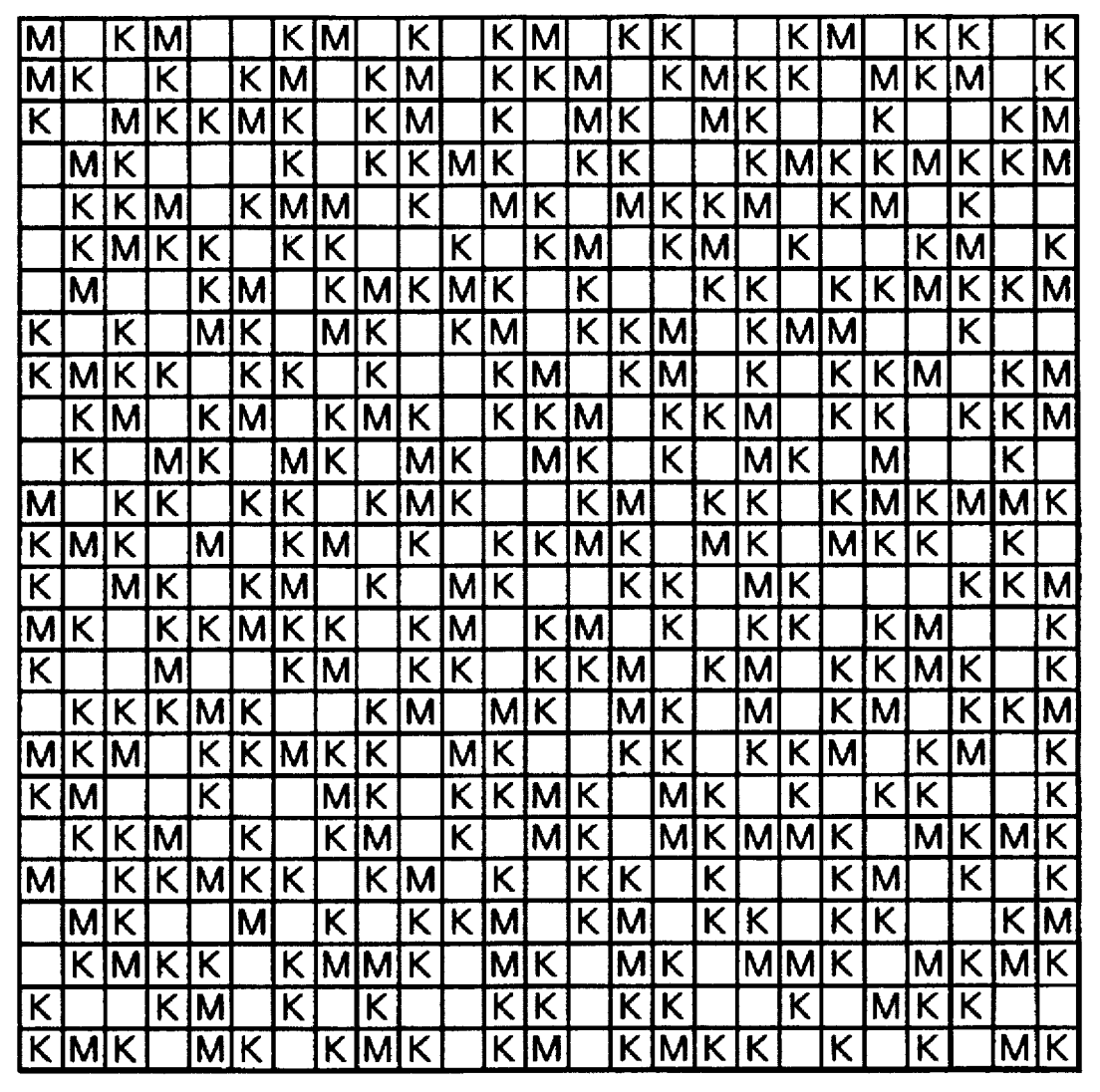
Figure 11:
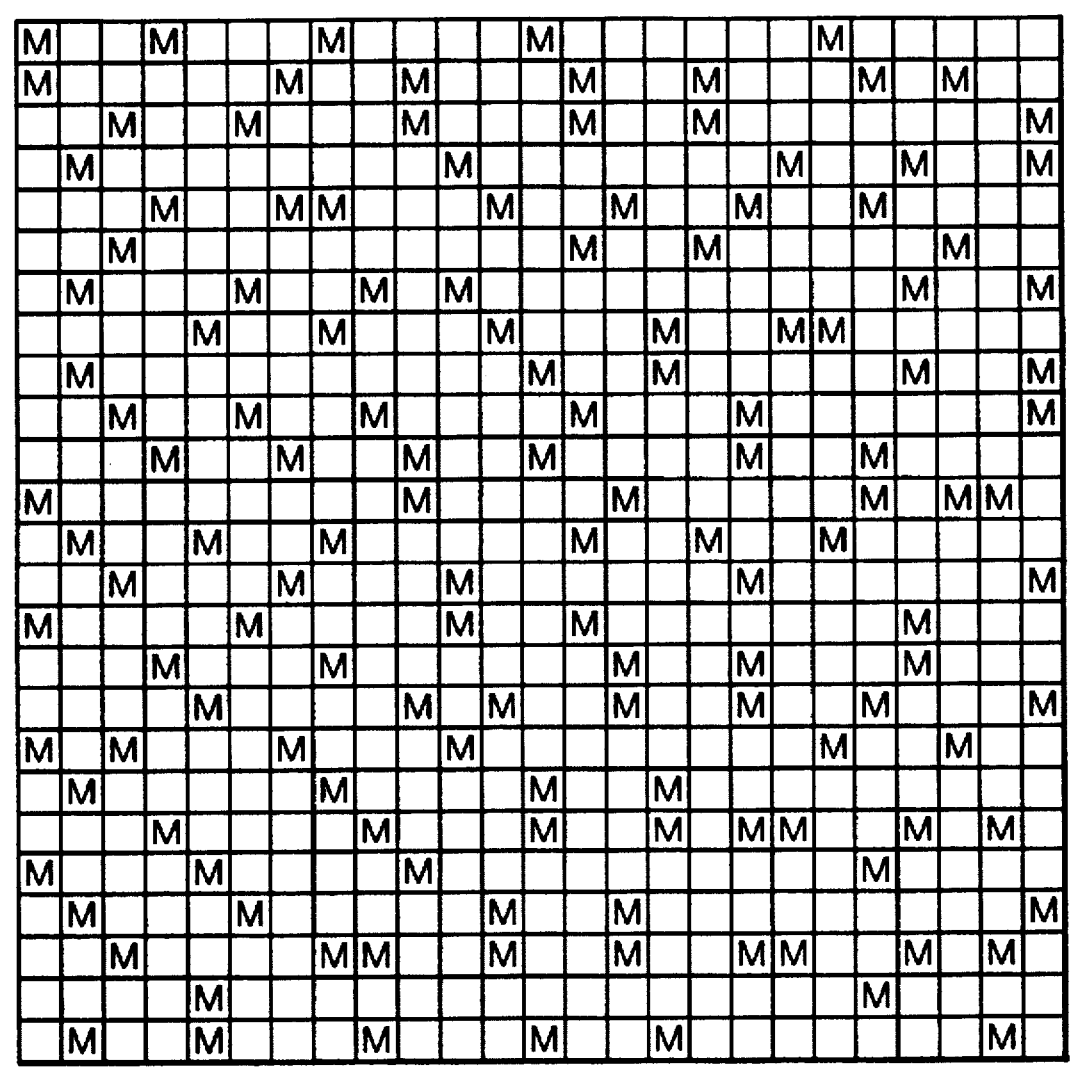

FIGS. 10 and 11 show how an output image is obtained through subjecting an original image to the image processing operations of FIGS. 6 through 8. In this original image, both magenta and black colors are uniformly and intimately distributed. That is, all the pixels of the original image have black input densities IK of 128, magenta input densities IM of 64, cyan input densities IC of 0, and yellow input densities IY of 0. FIG. 11 shows how magenta output data OM are obtained through the binarization process of FIG. 6. In the figure, M indicates pixels where magenta output data OM has a dot-forming value 255. As apparent from FIG. 11, the magenta-dot producing pixels M are distributed uniformly.

FIG. 10 shows a finally obtained color output image where magenta ink is applied to the magenta dot-forming pixels M in FIG. 11 and black ink is applied to black dot-forming pixels K. As apparent from FIG. 10, because magenta colors are uniformly distributed in the entire image, the output color image can properly represent the original image having uniformly distributed magenta and black colors.

According to the present invention, S103 is provided for correcting the input chromatic densities IC, IM, and IY into the corrected chromatic densities I'C, I'M, and I'Y in accordance with the value of the input black density IK. Accordingly, the obtained chromatic output data OC, OM, and OY can accurately reproduce chromatic density of the original image. Additionally, binarization errors ec, em, and ey will not be greatly increased and therefore will not overflow in the error buffers.

If the conversion step S103 is not provided in the binarization process of the present invention, due to the forcible zero settings of chromatic data, binarization errors em, ec, and ey will be greatly increased. Accordingly, error sums Ec, Em, and Ey will also be greatly increased. Due to the thus increased error sums, the number of pixels, where chromatic dots are produced, will be improperly increased. The chromatic densities, i.e., saturation, of the output image will therefore be improperly darkened. Especially when error sums are excessively increased, they will possible overflow in the binarization error buffers.

This phenomenon will be described in greater detail below with reference to a concrete example.

In this example, magenta and black colors are distributed uniformly over an original image. Input densities for all the pixels have the fixed values of IM=192, IK=128, IC=IY=0. The threshold T is assumed as set to 128. Generally, in order to reproduce achromatic tone, represented by the density value IK of 128, of the original image, black dots have to be formed in 50% (=128/255) of all the pixels constituting the output image. Similarly, in order to reproduce magenta density represented by the density value IM of 192, magenta dots have to be produced in 75% (=192/255) of all the pixels. It is noted, however, that according to step S105, magenta dots will not be produced at pixels where black dots are formed. Therefore, magenta dots can be produced only in a remaining half of all the pixels (i.e., 50%=100%−50%) where black dots are not formed. Accordingly, the number of pixels, where magenta dots can be produced, becomes less than the number of pixels, where magenta dots have to be produced. Accordingly, as the binarization processes are successively performed pixel by pixel, binarization errors "em" will greatly accumulate in the error buffers. Because the input densities IM are added with the thus greatly increased error sums Em in S104, magenta dots will be formed in almost all the remaining pixels where black dots are not formed. When almost all the non-black dot forming pixels are thus filled with magenta dots, however, magenta density of a produced output image will be improperly darkened in comparison with the original image. Additionally, there is a possibility that the binarization errors excessively accumulate and overflow in the magenta buffers 3am.

In order to accurately reproduce the magenta density of the original image, magenta dots should be located in 75% of the remaining area of the entire image where black dots are not produced. Because black dots are produced in 50% of all the pixels, magenta color dots should be produced in 37.5% (=(100−50) %×75%) of all the pixels. According to the present invention, therefore, the conversion process S103 is provided to first convert the original input density IM, which indicates the ratio of 75%, into a corrected density I'M which indicates the ratio of 37.5%. When the thus corrected density I'M is subjected to the binarization process, magenta dots will be properly produced almost in 37.5% of the entire image, i.e., almost 75% of the area where black dots are not produced. The thus produced magenta dots can properly reproduce the original magenta density as indicated by the original input density IM. Additionally, binarization errors will not be greatly increased, and therefore will not overflow in the error buffers.

Thus, according to the present invention, the conversion process S103 converts the input chromatic density Ii (where i=C, M, or Y) into corrected chromatic density I'i (where i=C, M, or Y). The corrected density I'i is defined as a product of the corresponding input density Ii and a ratio of a difference between a maximum inputtable density and the black input density IK relative to the maximum inputtable density. Each input chromatic density Ii originally defines a ratio R [%] of the number of pixels, where corresponding chromatic dots have to be produced, with respect to the total number of all the pixels. According to the present invention, the original input density Ii is not subjected to the binarization process, but the corrected value I'i is subjected to the binarization process. Accordingly, chromatic color dots will be produced almost in R [%] of the remaining area of the entire image where black dots are not produced. Thus produced chromatic dots will accurately reproduce the chromatic density of the original image as defined by the original input density Ii. Because the corrected value I'i is subjected to the binarization processes, binarization errors will not be greatly increased, and therefore will not overflow in the error buffers. Thus, according to the conversion step S103, the overflow of the binarization errors can be prevented.

It is noted that in order to prevent overflow of binarization errors, other various methods can be employed. These methods convert the input chromatic density Ii so that the converted chromatic density I'i will represent the number of pixels, where the corresponding color dots should be formed, as the number smaller than the amount of area where black colors are not formed. According to one possible method, when the sum of the magenta input density IM and the black input density IK is greater than the maximum inputtable density (255, for example), the input density IM is converted into I'M having a value obtained through subtracting the value IK from the maximum inputtable density.

While the invention has been described in detail with reference to the specific embodiment thereof, it would be apparent to those skilled in the art that various changes and modifications may be made therein without departing from the spirit of the invention, the scope of which is defined by the attached claims.

For example, the above-described embodiment is directed to a printer. However, the present invention can be applied to other various devices, such as a CRT display, for processing color images.

In the above-described embodiment, as shown in FIG. 12, four color input densities $IK_{00}$, $IC_{00}$, $IM_{00}$, and $IY_{00}$ for a first pixel are first subjected to the binarization process shown in FIG. 6. Then, four color input densities $IK_{01}$, $IC_{01}$, $IM_{01}$, and $IY_{01}$ for the next pixel are subjected to the binarization process. Thus, input densities are subjected to the binarization process pixel by pixel.

However, input densities can be subjected to the binarization process in other various orders.

For example, input densities may be subjected to the binarization process line by line. That is, color input densities $IK_{00}$, $IK_{01}$, $IK_{02}$, $IM_{00}$, $IM_{01}$, $IM_{02}$, ... are subjected to the binarization processes in this order. It is noted that at least until the judgement of S305 (FIG. 8) is completed for magenta, cyan, and yellow color components of one line, output data $OK_{00}$, $OK_{01}$, and $OK_{02}$ obtained for the subject line have to be maintained in the memory 6.

Or otherwise, input densities may be subjected to the binarization process screen by screen. That is, color input densities $IK_{00}$, $IK_{01}$, $IK_{02}$, $IK_{10}$, $IK_{11}$, $IK_{12}$, ..., and $TY_{22}$ are subjected to the binarization processes in this order. It is noted that at least until the judgement of S305 (FIG. 8) is completed for magenta, cyan, and yellow color components of one screen, output data $OK_{00}$, $OK_{01}$, $OK_{02}$, ..., and $OK_{22}$ obtained for one screen have to be maintained in the memory 6.

As described above, the color image processing device of the present invention binarizes a color continuous tone image to produce color pseudo-continuous tone image data. In the binarization process, input density data of a subject pixel for a plurality of color components are modified with corresponding sums of binarization errors. The binarization errors have been distributed to the subject pixel during error-diffusion binarization processes previously performed for at least one preceding nearby pixel. The plurality of color components include a predetermined color component (for example, black component) and at least one reference color component (for example, chromatic component).

The modified input density for the predetermined color component is then compared with a predetermined threshold value. Based on the compared result, binarized output data is determined for the predetermined color component. The binarized output data is either one of a dot-forming data, indicating production of a dot of the predetermined color component on the subject pixel, and non-dot forming data indicating production of no dots of the predetermined color component on the subject pixel.

When the binarized output data for the predetermined color component is a non-dot forming data, the modified input density of the subject pixel for the reference color component is compared with the predetermined threshold value. Based on the compared result, binarized output data is determined for the reference color component. Thus produced binarized output data is also either one of a dot-forming data, indicating production of a dot of the reference color component on the subject pixel, and non-dot forming data, indicating production of no dots of the reference color component on the subject pixel. On the other hand, when the binarized output data for the predetermined color component is a dot-forming data, binarized output data for the reference color component is determined as the non-dot forming data.

Afterwardly, a binarization error for the predetermined color component is determined as a difference between the modified input density data of the predetermined color component and the binarized output data for the predetermined color component. A binarization error for the reference color component is also determined as a difference between the modified input density data of the reference color component and the binarized output data for the reference color component. The binarization errors of the predetermined color component and of the reference color component are distributed or diffused to at least one subsequent nearby pixel which has not yet been binarized.

With the above-described binarization processes, even when the predetermined color component and the reference color component are closely mixed with each other in the original image, it is possible to obtain a pseudo-continuous tone image where those colors are properly arranged.

The input density data of the reference color component may be converted into a converted input density data based on the input density data of the predetermined color component. The converted input density data for the reference color component is then modified with a corresponding sum of binarization errors distributed to the subject pixel from the at least one preceding nearby pixel. In this case, overflow of binarization errors can be prevented. Additionally, the obtained color pseudo-continuous tone image can properly represent the reference color component of the input image.

The converted reference color input density data may be determined as the product of the input density data and a ratio of a difference between a maximum inputtable density data and the input density data of the predetermined color component relative to the maximum inputtable density data. Especially, in this case, it is possible to prevent darkening of chromatic density degree in the obtained pseudo-continuous tone image.

What is claimed is:

1. A color image processing device for binarizing a color continuous tone image to produce color pseudo-continuous tone image data, the device comprising:

modification means for modifying input density data of each pixel for each of a plurality of color components with a corresponding sum of binarization errors which are distributed to the subject pixel from at least one preceding nearby pixel, the plurality of color components including a predetermined color component and at least one reference color component;

predetermined color output determination means for comparing the modified input density of the subject pixel for the predetermined color component with a predetermined threshold value, thereby determining binarized output data for the predetermined color component, the binarized output data being either one of a dot-forming data and an on-dot forming data, the dot-forming data indicating production of a dot of the predetermined color component on the subject pixel, the non-dot forming data indicating production of no dots of the predetermined color component on the subject pixel;

reference color output determination means for comparing, when the binarized output data for the predetermined color component is a non-dot forming data, the modified input density of the subject pixel for the reference color component with the predetermined threshold value, thereby determining binarized output data for the reference color component, the binarized output data being either one of a dot-forming data and a non-dot forming data, the dot-forming data indicating production of a dot of the reference color component on the subject pixel, the non-dot forming data indicating production of no dots of the reference color component on the subject pixel, the reference color output determination means determining binarized output data for the reference color component as the non-dot forming data when the binarized output data for the predetermined color component is a dot-forming data;

binarization error determining means for determining a binarization error for the predetermined color component as a difference between the modified input density data of the predetermined color component and the binarized output data for the predetermined color component and for determining a binarization error for the reference color component as a difference between the modified input density data of the reference color component and the binarized output data for the reference color component; and means for distributing the binarization errors of the predetermined color component and of the reference color component to at least one subsequent nearby pixel which has not yet been binarized.

2. A color image processing device of claim 1, further comprising reference color conversion means for converting the input density data of the reference color component into a converted input density data based on the input density data of the predetermined color component, the modification means modifying the converted input density data of the subject pixel for the reference color component with the corresponding sum of binarization errors distributed to the subject pixel from the at least one preceding nearby pixel.

3. A color image processing device of claim 2, wherein the reference color conversion means calculates, as the converted input density data, a product of the input density data of the reference color component and a ratio of a difference between a maximum inputtable density data and the input density data of the predetermined color component relative to the maximum inputtable density data.

4. A color image processing device of claim 3, wherein the predetermined color component is black, the reference color conversion means converting the input density data of the reference color component into data which represents a chromatic density degree of the reference color component.

5. A color image processing device of claim 3, wherein the modification means addes, to input density data of each pixel for the predetermined color component, with a sum of binarization errors for the predetermined color component which are distributed to the subject pixel, the modification means adding, to the value calculated by the reference color conversion means for the reference color component of each pixel, with a sum of binarization errors for the reference color component which are distributed to the subject pixel.

6. A color image processing device of claim 1, wherein the predetermined color component is black, and the at least one reference color component is cyan, magenta, and yellow.

7. A color image processing device of claim 1, wherein the binarization error distributing means distributes the binarization errors of the predetermined color component and of the reference color component, according to a predetermined weight set, to the at least one subsequent nearby pixel.

8. A color image processing device of claim 7, further comprising accumulating means assigned to each pixel for each color component, the accumulating means accumulating the binarization errors produced at the at least one preceding nearby pixel and distributed to the subject pixel, thereby obtaining the sum of the binarization errors for each color component of each pixel.

9. A color image processing device of claim 1, wherein the modification means addes, to input density data of each object pixel for each of a plurality of color components, a corresponding sum of binarization errors which are distributed to the subject pixel from at least one preceding nearby pixel.

10. A color image processing device of claim 1, further comprising means for receiving input density data for the plurality of color components of each pixel.

11. A method of binarizing a color continuous tone image to produce color pseudo-continuous tone image data, the method comprising the steps of:

modifying input density data of one pixel for each of a plurality of color components with a corresponding sum of binarization errors which are distributed to the subject pixel during error-diffusion binarization processes previously performed for at least one preceding nearby pixel, the plurality of color components including a predetermined color component and at least one reference color component;

comparing the modified input density of the subject pixel for the predetermined color component with a predetermined threshold value, thereby determining binarized output data for the predetermined color component, the binarized output data being either one of a dot-forming data and non-dot forming data, the dot-forming data indicating production of a dot of the predetermined color component on the subject pixel, the non-dot forming data indicating production of no dots of the predetermined color component on the subject pixel;

comparing, when the binarized output data for the predetermined color component is a non-dot forming data, the modified input density of the subject pixel for the reference color component with the predetermined threshold value, thereby determining binarized output data for the reference color component, the binarized output data being either one of a dot-forming data and a non-dot forming data, the dot-forming data indicating production of a dot of the reference color component on the subject pixel, the non-dot forming data indicating production of no dots of the reference color component on the subject pixel;

determining binarized output data for the reference color component as the non-dot forming data when the binarized output data for the predetermined color component is a dot-forming data;

determining a binarization error for the predetermined color component as a difference between the modified input density data of the predetermined color component and the binarized output data for the predetermined color component and determining a binarization error for the reference color component as a difference between the modified input density data of the reference color component and the binarized output data for the reference color component; and distributing the binarization errors of the predetermined color component and of the reference color component to at least one subsequent nearby pixel which has not yet been binarized.

12. A method of claim 11, further comprising the step of converting the input density data of the reference color component into a converted input density data based on the input density data of the predetermined color component, the converted input density data of the subject pixel for the reference color component being modified with the corresponding sum of binarization errors distributed to the subject pixel from the at least one preceding nearby pixel.

13. A method of claim 12, wherein the converted input density data is calculated as a product of the input density data of the reference color component and a ratio of a difference between a maximum inputtable density data and the input density data of the predetermined color component relative to the maximum inputtable density data.

14. A method of claim 13, wherein the predetermined color component is black, the converted input density data of the reference color component represents a chromatic density degree of the reference color component.

15. A method of claim 13, wherein the input density data of the subject pixel for the predetermined color component is added with a sum of binarization errors for the predetermined color component which are distributed to the subject pixel, and wherein the converted input density data for the reference color component of the subject pixel is added with a sum of binarization errors for the reference color component which are distributed to the subject pixel.

16. A method of claim 11, wherein the predetermined color component is black, and the at least one reference color component is cyan, magenta, and yellow.

17. A method of claim 11, wherein the binarization errors of the predetermined color component and of the reference color component are distributed, according to a predetermined weight set, to the at least one subsequent nearby pixel.

18. A method of claim 17, further comprising the step of adding the binarization errors produced at the subject pixel and distributed to at least one subsequent pixel, thereby obtaining the sum of the binarization errors for each color component of the subject pixel.

* * * * *